(12) United States Patent
Hung et al.

(10) Patent No.: US 9,229,180 B2
(45) Date of Patent: *Jan. 5, 2016

(54) OPTICAL COMMUNICATION DEVICE

(71) Applicant: HON HAI PRECISION INDUSTRY CO., LTD., New Taipei (TW)

(72) Inventors: Yi Hung, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 42 days.

This patent is subject to a terminal disclaimer.

(21) Appl. No.: 14/101,355

(22) Filed: Dec. 10, 2013

(65) Prior Publication Data

US 2015/0117815 A1    Apr. 30, 2015

(30) Foreign Application Priority Data

Oct. 29, 2013 (TW) ............................. 102139172 A

(51) Int. Cl.
*G02B 6/32* (2006.01)
*G02B 6/42* (2006.01)

(52) U.S. Cl.
CPC ............ G02B 6/4214 (2013.01); G02B 6/4249 (2013.01); *G02B 6/32* (2013.01)

(58) Field of Classification Search
CPC ...... G02B 6/32; G02B 6/4206; G02B 6/4214; G02B 6/4204; G02B 6/4246
USPC .................................. 385/14, 15, 31, 33, 39
See application file for complete search history.

(56) References Cited

U.S. PATENT DOCUMENTS 7,373,044 B2 *   5/2008   Sekiya et al. ................... 385/36
2015/0049985 A1 *   2/2015   Hung .............................. 385/33

* cited by examiner

*Primary Examiner* — Jennifer Doan
(74) *Attorney, Agent, or Firm* — Novak Druce Connolly Bove + Quigg LLP

(57) ABSTRACT

An optical communication device includes a first fiber, a second fiber, a light-emitting unit, a light-receiving unit, and a lens unit. The lens unit includes a first portion and a second portion connecting with the first portion. The first portion includes a first entrance surface, a first exit surface, and a first reflecting surface. The first entrance surface is perpendicular to the first exit surface. The first optical fiber faces the first entrance surface and the light-receiving unit faces the first exit surface. The second portion includes a second entrance surface, a second exit surface, and a second reflecting surface. The second entrance surface is perpendicular to the second exit surface. The first entrance surface and the second exit surface are coplanar.

13 Claims, 2 Drawing Sheets

OPTICAL COMMUNICATION DEVICE

BACKGROUND

1. Technical Field

The present disclosure relates to communication devices, and particularly to an optical communication device.

2. Description of Related Art

Optical communication devices include optical fibers, light-emitting units, a lens unit, and light-receiving units. The optical fibers include entrance optical fibers and exit optical fibers. The lens unit is configured for coupling the optical fibers to the light-emitting units and the light-receiving units.

The lens unit includes entrance lenses and exit lenses. The entrance lenses and the exit lenses are on a same surface of the lens unit. Thus, the entrance optical fibers and the exit optical fibers are on the same side of the lens unit. The optical communication devices include many optical fibers, the lens unit cannot have enough area for setting the entrance lenses and the exit lenses.

Therefore, it is desirable to provide an optical communication device, which can overcome the limitation described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
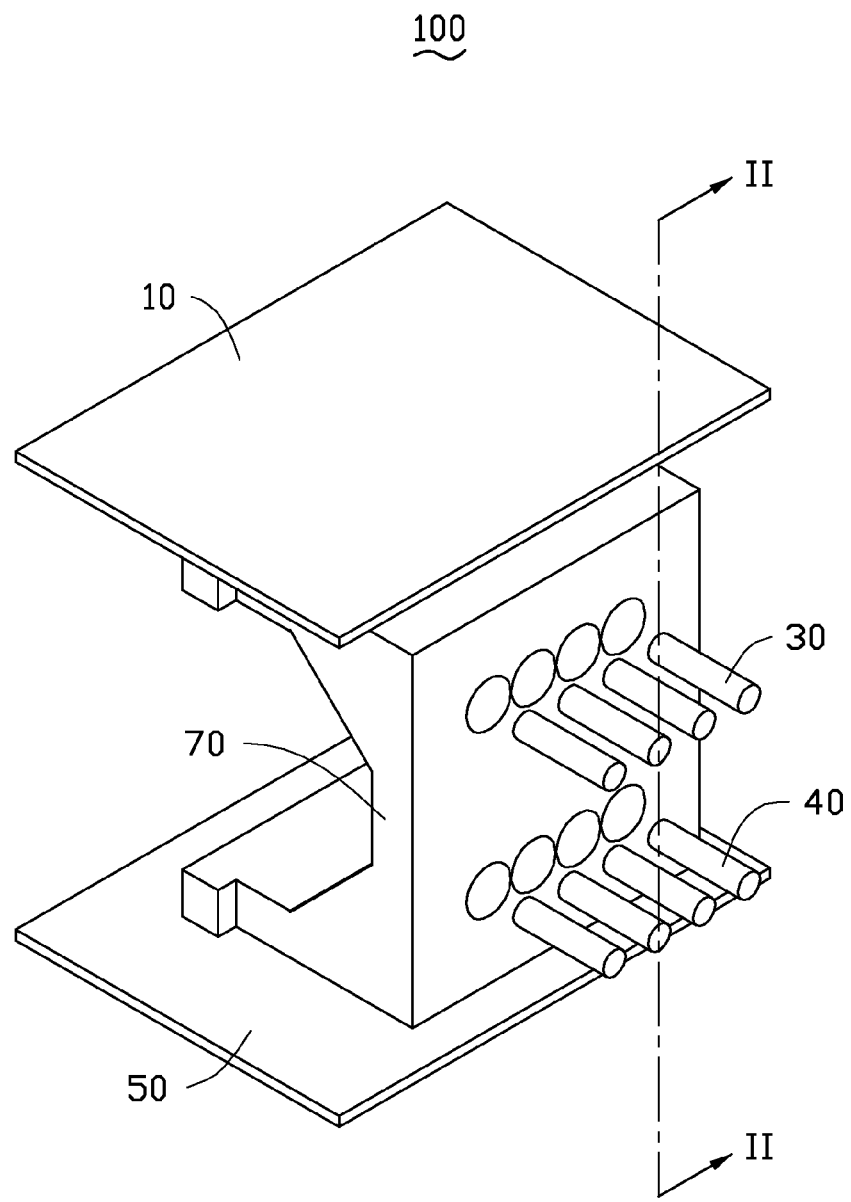
FIG. 1 is a schematic view of an optical communication device, according to an exemplary embodiment of the present disclosure.
Figure 2:
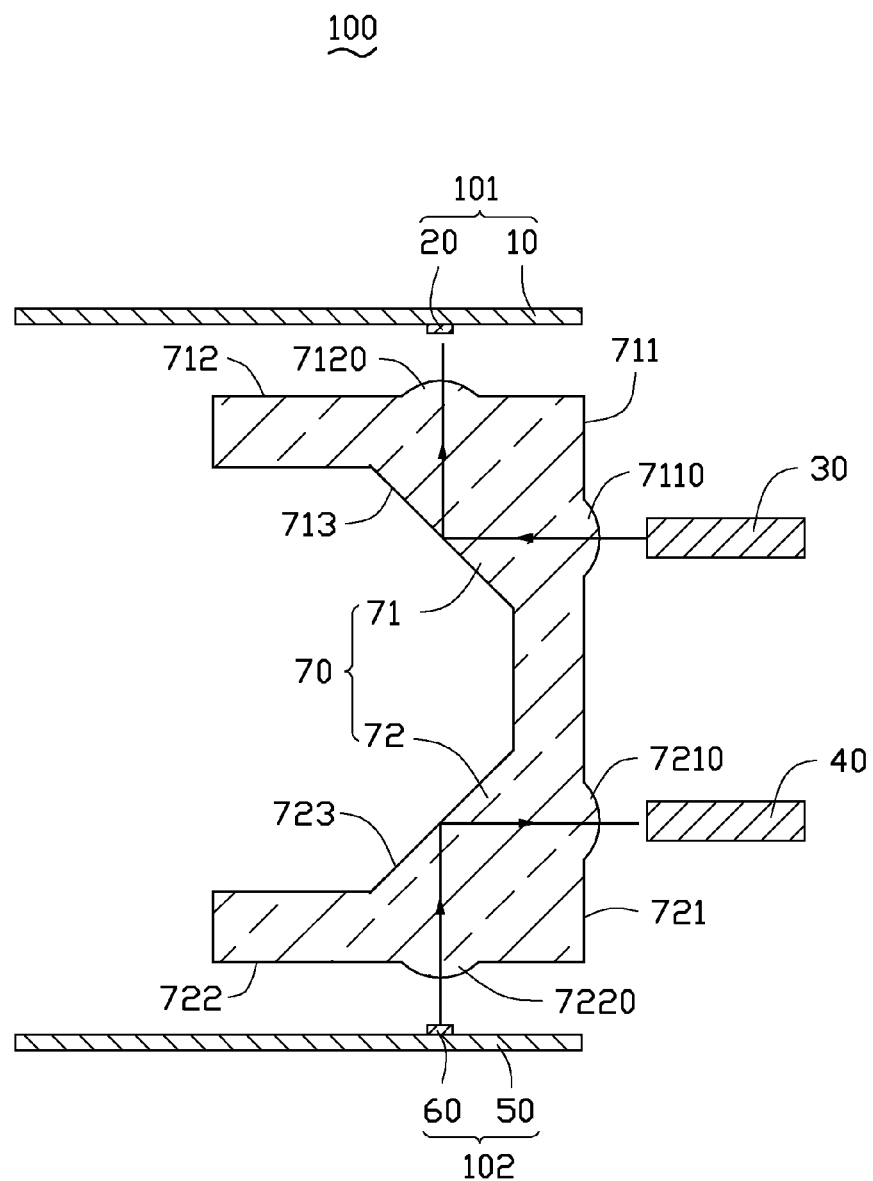
FIG. 2 is a cross-sectional view of the optical communication device, taken along line II-II of FIG. 1.

FIGS. 1-2 show an exemplary embodiment of an optical communication device 100. The optical communication device 100 includes a light-receiving unit 101, a light-emitting unit 102, a first optical fiber 30, a second optical fiber 40, and a lens unit 70. The light-receiving unit 101 includes a first circuit board 10 and a photodiode 20. The light-emitting unit 102 includes a second circuit board 50 and a light-emitting element 60. The lens unit 70 is configured for coupling the first optical fiber 30 to the light-receiving unit 101 and is configured for coupling the second optical fiber 40 to the light-emitting unit 102.

The first circuit board 10 can be a hard circuit board or a flexible circuit board. The second circuit board 50 can also be a hard circuit board or a flexible circuit board. The light-emitting element 60 can be a light-emitting diode or a laser diode.

The lens unit 70 includes a first portion 71 and a second portion 72 connected with the first portion 71. The first portion 71 is configured for coupling the first optical fiber 30 to the light-receiving unit 101. The second portion 72 is configured for coupling the second optical fiber 40 to the light-emitting unit 102.

The first portion 71 includes a first entrance surface 711, a first exit surface 712, and a first reflecting surface 713. The first entrance surface 711 is substantially perpendicular to the first exit surface 712. An included angle between the first reflecting surface 713 and the first entrance surface 711 is 45 degrees. An included angle between the first reflecting surface 713 and the first exit surface 712 is also 45 degrees. Four first entrance lenses 7110 are defined on the first entrance surface 711 and four first exit lenses 7120 are defined on the first exit surface 712. The first optical fiber 30 is located to face the first entrance lenses 7110. The light-receiving unit 101 faces the first exit lenses 7120. Light emitted by the first optical fiber 30 emits onto the first reflecting surface 713 of the first portion 71 through the first entrance lenses 7110 of the first entrance surface 711. After the light is reflected by the first reflecting surface 713, the light exits from the first portion 71 through the first exit lenses 7120. The light-receiving element 20 receives the light.

In other embodiments, the number of the first entrance lens 7110 and the first exit lens 7120 can be one, two, or three, etc.

The second portion 72 includes a second exit surface 721, a second entrance surface 722, and a second reflecting surface 723. The second exit surface 721 and the first entrance surface 711 are coplanar. The second reflecting surface 723 is substantially perpendicular to the first reflecting surface 713 of the first portion 71. The second entrance surface 722 is parallel with the first exit surface 712 of the first portion 71.

The second exit surface 721 is substantially perpendicular to the second entrance surface 722. An included angle between the second reflecting surface 723 and the second exit surface 721 is 45 degrees. An included angle between the second reflecting surface 723 and the second entrance surface 722 is also 45 degrees. Four second exit lenses 7210 are defined on the second exit surface 721 and four second entrance lenses 7220 are defined on the second entrance surface 722. The second optical fiber 40 is located to face the second exit surface 721. The light-emitting unit 102 faces the second entrance surface 722. Light emitted by the light-emitting element 60 of the light-emitting unit 102 is emitted onto the second reflecting surface 723 of the second portion 72 through the second entrance lenses 7220. The light is reflected by the second reflecting surface 723 onto the second exit lenses 7210 to enter the second optical fiber 40.

In other embodiments, the number of the second entrance lens 7220 and the second exit lens 7210 can be one, two, or three, etc.

The lens unit 70 includes the first portion 71 and the second portion 72. The light-emitting unit 102 is located to face the second entrance surface 722 of the second portion 72 and the light-receiving unit 101 is located to face the first exit surface 712 of the first portion 71. The first exit surface 712 and the second entrance surface 722 are on opposite sides of the lens unit 70. Even if the optical communication device 100 includes more than four first optical fibers 30 and second optical fibers 40, the lens unit 70 can have enough area for setting the first entrance lens 7110, the first exit lens 7120, the second entrance lens 7220, and the second exit lens 7210.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely exemplary embodiments of the disclosure.

What is claimed is:

1. An optical communication device, comprising:
   a light-receiving unit;
   a first optical fiber;
   a light-emitting unit;
   a second optical fiber; and
   a lens unit, wherein the lens unit comprises a first portion and a second potion, the first portion comprises a first entrance surface, a first exit surface, and a first reflecting surface, the first entrance surface is perpendicular to and connected to the first exit surface, the first entrance surface, the first exit surface, and the first reflecting surface are arranged in a triangular shape, the first optical fiber faces the first entrance surface, the light-receiving unit faces the first exit surface, the second portion comprises a second entrance surface, a second exit surface, and a second reflecting surface, the second entrance surface is perpendicular to and connected to the second exit surface, the first entrance surface and the second exit surface are coplanar, the second entrance surface, the second exit surface, and the second reflecting surface are arranged in a triangular shape, the first exit surface is parallel with the second entrance surface.

2. The optical communication device of claim 1, wherein the light-receiving unit comprises a first circuit and a photo diode, the photo diode is located on and electrically connected to the first circuit board.

3. The optical communication device of claim 2, wherein the first circuit board is selected from the group consisting of hard circuit board and flexible circuit board.

4. The optical communication device of claim 1, wherein the light-emitting unit comprises a second circuit board and a light-emitting element, the light-emitting element is located on and electrically connected to the second circuit board.

5. The optical communication device of claim 4, wherein the light-emitting element is selected from the group consisting of a light-emitting diode and a laser diode.

6. The optical communication device of claim 4, wherein the second circuit board is selected from the group consisting of hard circuit board and flexible circuit board.

7. The optical communication device of claim 1, wherein the first entrance surface comprises a first entrance lens, the first exit surface comprises a first exit lens, light emitted by the first optical fiber emits onto the first reflecting surface of the first portion through the first entrance lens, the light reflected by the first reflecting surface emits onto the first exit lens to enter the light-receiving unit.

8. The optical communication device of claim 1, wherein the second entrance surface comprises a second lens, the second exit surface comprises a second lens, light emitted by the light-emitting unit is emitted on the second reflecting surface of the second portion through the second entrance lens, the light is reflected by the second reflecting surface onto the second exit lens to enter the second optical fiber.

9. The optical communication device of claim 1, wherein the first reflecting surface is perpendicular with the second reflecting surface.

10. The optical communication device of claim 1, wherein an included angle between the first reflecting surface and the first entrance surface is 45 degrees, an included angle between the first reflecting surface and the first exit surface is 45 degrees.

11. The optical communication device of claim 1, wherein an included angle between the second reflecting surface and the second entrance surface is 45 degrees, an included angle between the second reflecting surface and the second exit surface is 45 degrees.

12. The optical communication device of claim 1, wherein the first entrance surface is directly connected to the first exit surface and the second entrance surface is directly connected to the second exit surface.

13. The optical communication device of claim 12, wherein the lens unit is formed in one-piece structure.

* * * * *